United States Patent
Lee et al.

(10) Patent No.: US 9,491,169 B2
(45) Date of Patent: Nov. 8, 2016

(54) GENERATION AND AUTHENTICATION OF BIOMETRIC INFORMATION USING WATERMARK

(71) Applicant: SUPREMA INC., Seongnam-si (KR)

(72) Inventors: Kideok Lee, Seongnam-si (KR); Hochul Shin, Seongnam-si (KR); Jinwook Yi, Seongnam-si (KR); Bong Seop Song, Seongnam-si (KR); Jae Won Lee, Seongnam-si (KR)

(73) Assignee: SUPREMA INC., Gyeonggi-Do (KR)

( * ) Notice: Subject to any disclaimer, the term of this patent is extended or adjusted under 35 U.S.C. 154(b) by 0 days.

(21) Appl. No.: 14/586,119

(22) Filed: Dec. 30, 2014

(65) Prior Publication Data
US 2015/0365406 A1 Dec. 17, 2015

(30) Foreign Application Priority Data
Jun. 11, 2014 (KR) ........................ 10-2014-0070938

(51) Int. Cl.
*H04L 9/32* (2006.01)
*H04L 29/06* (2006.01)

(52) U.S. Cl.
CPC ......... *H04L 63/0861* (2013.01); *H04L 9/3228* (2013.01); *H04L 9/3231* (2013.01); *H04L 63/0838* (2013.01)

(58) Field of Classification Search
None
See application file for complete search history.

(56) References Cited

U.S. PATENT DOCUMENTS

| 6,067,621 | A | * | 5/2000 | Yu | G06F 21/34 713/168 |
|---|---|---|---|---|---|
| 6,748,533 | B1 | * | 6/2004 | Wu | G06T 1/0028 382/115 |
| 7,036,024 | B2 | * | 4/2006 | Watson | H04N 5/913 726/22 |
| 7,363,494 | B2 | * | 4/2008 | Brainard | G06Q 20/32 380/232 |
| 7,519,989 | B2 | * | 4/2009 | Lin | G06F 21/34 713/172 |
| 9,218,473 | B2 | * | 12/2015 | Yi | G06F 21/32 |
| 2010/0052852 | A1 | * | 3/2010 | Mohanty | B42D 25/00 340/5.83 |

FOREIGN PATENT DOCUMENTS

KR 2003-0045419 6/2003

* cited by examiner

*Primary Examiner* — Christopher Revak
(74) *Attorney, Agent, or Firm* — Ladas & Parry, LLP

(57) ABSTRACT

An apparatus for generating biometric information, the apparatus includes a biometric scanning module configured to scan a body of a user to generate biometric image information; a seed supplying module configured to supply a secure seed having a security that is effective for a preset time period; a security pattern generating module configured to generate a secure watermark pattern based on the secure seed; and a biometric information generating module configured to generate biometric information to be used for authentication by the use of the biometric image information and the secure watermark pattern.

14 Claims, 4 Drawing Sheets

GENERATION AND AUTHENTICATION OF BIOMETRIC INFORMATION USING WATERMARK

RELATED APPLICATIONS

This application claims the benefit of Korean Patent Application No. 10-2014-0070938, filed on Jun. 11, 2014, which is hereby included by reference as if fully set forth herein.

FIELD OF THE INVENTION

The present invention relates to the creation and authentication of biometric information using watermarks, and more particularly, to an apparatus and method for generating biometric information with a security that is effective for a predetermined time period, an apparatus and method for authenticating the biometric information with the security, and a system for generating and authenticating the biometric information using the same.

BACKGROUND OF THE INVENTION

As is well known, by virtue of the development of information technologies and the Internet, the size of the market related to online e-commerce and user identification increases and the demand for accurate authentication of users also grows. Consequently, existing methods for user authentication such as PIN (Personal Identification Number) or password has reached its maximum limit.

In contrast, user authentication using biometrics is not only convenient to use and but also commercially available because of its security and economics. The user authentication using biometrics is used mainly in embedded systems such as ATM (Automated Teller Machines) or personal computers. In recent years, thanks to the development of biometric technologies, the use of the user authentication is increasingly expanding to the field of mobile devices.

Biometric information such as fingerprints may have prominent features. Among other things, the biometric information has unique advantages that it allows individuals to be free from a fear of forgetting their passwords and that the authentication of the biometric information cannot be done without intervening a relevant person with the biometric information.

The biometric information may be converted into digital data and stored in personal computers, handheld devices, servers, or the like for future use. In this case, if the data for the biometric information is leaked and collected for malicious purpose, which may cause severe problems different from the outflow of the passwords.

A password of a user may be used by changing it another although it is leaked or stolen. In contrast, if biometric information of a user is leaked or stolen, the user may be faced with a situation that he/she may not use the relevant biometric information for a lifetime. As an example, if leaked or stolen biometric information is data for an index or middle finger of a right hand of the user, which has already been registered as the biometric information, biometric information for other fingers of the user may be used instead of that of the index finger or middle finger since then. However, there may be a possibility that even data of the other fingers may also be leaked or stolen. Furthermore, everyone has a limited number of fingers, which may leads to many constraints. Since different biometric information such as face, finger vein and the like also has a unique value for each individual, when it is leaked out once, it may result in fatal effects.

Furthermore, the crucial feature of the biometric information is the fact that data relevant to the biometric information may be varied little by little each time the data is acquired. Thus, in terms of the principle in which the biometric authentication uses the similarity to the biometric information registered in advance, biometric information that is newly acquired for the biometric authentication may not be 100% consistent with the biometric information registered in advance, which makes it difficult to apply an advanced encryption algorithm to the biometric authentication.

In order to avoid the above issues, a widely used method is to either encrypt data related to the biometric information and then send the encrypted data, or employ a permanent deformation from which an inverse conversion cannot be achieved by using a fuzzy vault.

However, even though the biometric information is encrypted or modified, if the data is leaked once, an attempt to authenticate falsely may be made at any time later with the leaked data. Therefore, the aforementioned method may not be a fundamental solution.

Meanwhile, in order to enhance a security in creation and authentication of the biometric information, there have been proposed techniques to prevent the biometric information from being faked or falsified by inserting watermarks into the biometric information.

Nevertheless, because devices employed in authenticating the biometric information may always be exposed to the risk of hacking, biometric certificates in the devices may almost be leaked or stolen along with the watermark inserted therein. In this case, it may result in losing even the security of the watermark.

SUMMARY OF THE INVENTION

In view of the above, the present invention provides an apparatus and method of generating biometric information for authentication having a secure watermark pattern included therein, which is effective for a predetermined time period.

Further, the present invention provides an apparatus and method of authenticating biometric information for authentication having a secure watermark pattern included therein, which is effective for a predetermined time period.

Further, the present invention provides a system for generating and authenticating biometric information, which incorporates an apparatus for generating biometric information for authentication having a secure watermark pattern included therein, which is effective for a predetermined time, and an apparatus for authenticating the biometric information.

In accordance with a first aspect of the present invention, there is provided an apparatus for generating biometric information, the apparatus includes: a biometric scanning module configured to scan a body of a user to generate biometric image information; a seed supplying module configured to supply a secure seed having a security that is effective for a preset time period; a security pattern generating module configured to generate a secure watermark pattern based on the secure seed; and a biometric information generating module configured to generate biometric information to be used for authentication by the use of the biometric image information and the secure watermark pattern.

Further, the apparatus may, wherein the seed supplying module comprises a watermark key receiving unit configured to receive a watermark key which will be used as the secure seed and provide it to the security pattern generation, wherein the watermark key is provided in real-time from an biometric authentication apparatus which utilizes the biometric information to authenticate the user.

Further, the apparatus may, wherein the seed supplying module comprises a one-time password (OTP) generating unit configured to generate an OTP that is effective for the preset time period and supply the OTP to the secure pattern generating module as the secure seed.

In accordance with a second aspect of the present invention, a method for generating biometric information to be used for authentication, the method includes: generating biometric image information by scanning a body of a user; generating a secure watermark pattern based on a secure seed having a security that is effective for a preset time period; and generating the biometric information through the use of the biometric image information and the secure watermark pattern.

Further, the method may, wherein said generating a secure watermark pattern generating the secure watermark pattern using a watermark key which is received in real-time from an biometric authentication apparatus which utilizes the biometric information to authenticate the user.

Further, the method may, wherein said generating a secure watermark pattern generating the secure watermark pattern using an one-time password (OTP) that is effective for the preset time period.

In accordance with a third aspect of the present invention, there is provided an apparatus for authenticating biometric information, the apparatus includes: a seed generating module configured to generate a secure seed having a security that is effective for a preset time period; a secure pattern verifying module configured to perform a primary authentication on biometric information to be used for authentication when the biometric information includes a secure watermark pattern that can be generated based on the secure seed; a biometric information storage module configured to store reference biometric information to be used for an authentication procedure; and a biometric authenticating module configured to perform a secondary authentication depending on a result of comparison between the biometric information and the reference biometric information when the primary authentication has been performed.

Further, the apparatus may, wherein the seed generating module comprises a watermark key generating unit configured to generate in real time a watermark key as the secure seed which is capable of generating the secure watermark pattern.

Further, the apparatus may, wherein the watermark key generating unit is configured to provide the watermark key to a biometric information generating apparatus which generates the biometric information by scanning a body of a user.

Further, the apparatus may, wherein the seed generating module comprises an OTP generating unit configured to generate a one-time password (OTP) as the secure seed that is effective for the preset time period.

In accordance with a fourth aspect of the present invention, a method for authenticating biometric information, the method includes: generating a secure seed having a security that is effective for a preset time period; performing a primary authentication on biometric information to be used for authentication when the biometric information includes a secure watermark pattern that can be generated based on the secure seed; and performing a secondary authentication depending on a result of comparison between the biometric information and a pre-stored reference biometric information.

Further, the method may, wherein said generating a secure seed comprises generating in real time a watermark key as the secure seed that is capable of generating the secure watermark pattern.

Further, the method may, wherein said generating a secure seed comprises generating an one-time password (OTP) as the secure seed that is effective for the preset time period.

In accordance with a fifth aspect of the present invention, a system for generating and authenticating biometric information, the system includes: a biometric information generating apparatus configured to generate biometric image information by scanning a body of a user, generate a secure watermark pattern based on the secure seed, which is effective for a preset time period, and generate biometric information to be for authentication through the use of the biometric image information and the secure watermark pattern; and a biometric information authenticating apparatus configured to perform a primary authentication on the biometric information when the biometric information includes a secure watermark pattern that can be generated based on the secure seed and perform a secondary authentication depending on a result of comparison between the biometric information and a pre-stored reference biometric information.

In accordance with the embodiments of the present invention, the biometric information having the secure watermark pattern included therein, which is effective for a predetermined time period, is generated in order to use a biometric authentication of a user. When a biometric authentication of the biometric information, it is normally conducted if the secure watermark pattern included in the biometric information is generated within the predetermined time period.

Therefore, even if the biometric information having the secure watermark pattern included therein is leaked from a device which utilizes the biometric information to authenticate the user due to the hacking or the like, the leaked biometric information will be useless when the predetermined time period has lapsed. Accordingly, the authentication of the leaked biometric information will be failed, thereby guaranteeing an improved security for the biometric information.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Hereinafter, the embodiments of the present invention will be described in detail with reference to the accompanying drawings.

Figure 1:
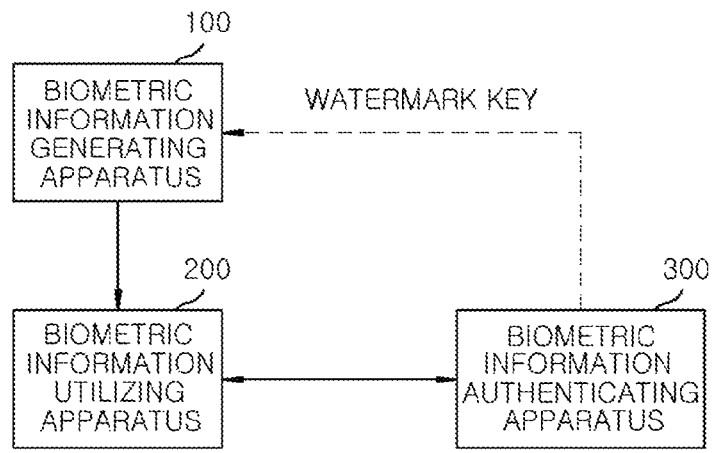
FIG. 1 is an overall configuration diagram of a system for generating and authenticating biometric information in accordance with an embodiment of the present invention.

FIG. 1 is an overall configuration diagram of a system for generating and authenticating biometric information in accordance with an embodiment of the present invention.

As illustrated in the drawing, the system for generating and authentication biometric information includes a biometric information generating apparatus 100, a biometric information utilization apparatus 200 and a biometric information authenticating apparatus 300.

The biometric information generating apparatus 100 generates biometric image information by scanning a human body of a user. The biometric information generating apparatus 100 also generates a secure watermark pattern based on a secure seed having a security that is effective for a preset time period and then generates biometric information used for authentication of the user through the use of both the biometric image information and the secure watermark pattern.

The biometric information generating apparatus 100 may include biometric image obtaining devices capable of obtaining a biometric image of the user, for example, an optical sensor or a capacitive sensor to scan fingerprints of the user, a camera to scan a face and iris of the user, and a three-dimensional camera to scan depth information of the face, all of which may be integrally.

The biometric information utilization apparatus 200 refers to a client device to be supplied with various services or contents by utilizing the biometric information generated by the biometric information generating apparatus 100 to authenticate the user. The biometric information utilization apparatus 200 may be connected with the biometric information authenticating apparatus 300 through wirelessly or wired network and request the biometric information authenticating apparatus 300 to authenticate the biometric information.

Upon receiving the biometric information along with a request for authentication thereof, the biometric information authenticating apparatus 300 performs a primary authentication on the biometric information requested for authentication in case where the biometric information incorporates a secure watermark pattern that can be generated using a secure seed and then performs a secondary authentication on the biometric information depending on a result of comparison between the biometric information requested for authentication and a pre-stored reference biometric information when the primary authentication has been performed.

Figure 2:
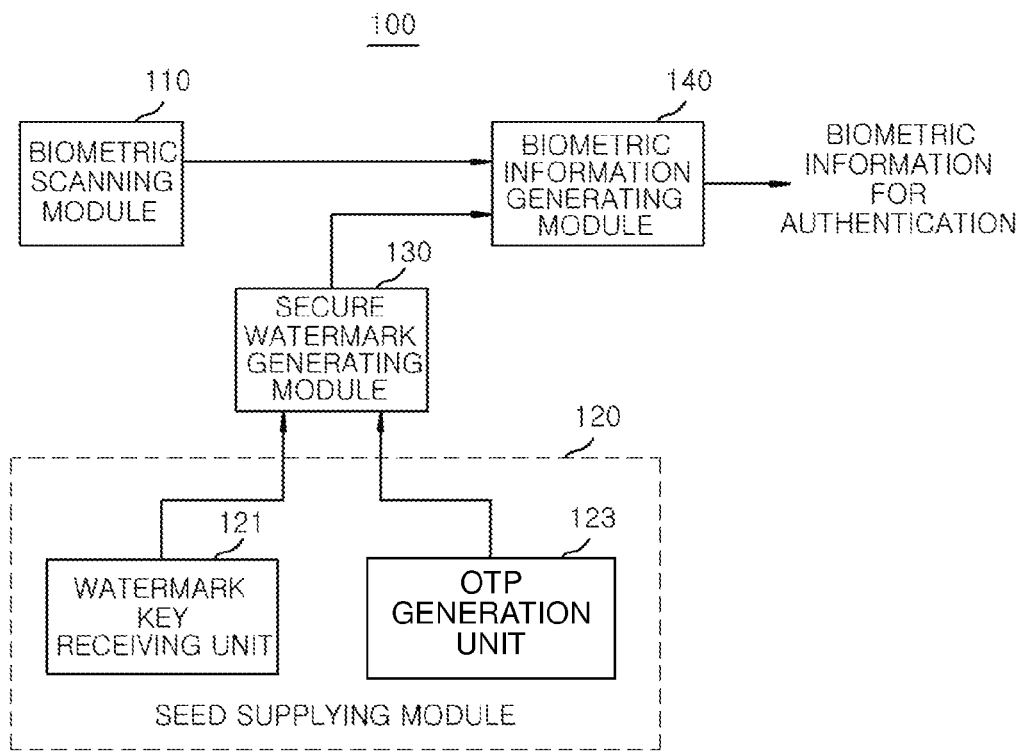
FIG. 2 is a block diagram of a biometric information generating apparatus in accordance with an embodiment of the present invention.

FIG. 2 is a block diagram of the biometric information generating apparatus 100 in accordance with an embodiment of the present invention.

As illustrated in the drawing, the biometric information generating apparatus 100 includes a biometric scanning module 110, a seed supplying module 120, a secure pattern generating module 130, and a biometric information generating module 140. The seed supplying module 120 includes a watermark key receiving unit 121 and a one-time password (OTP) generation unit 123.

Referring to FIG. 2, the biometric scanning module 110 is configured to scan the body of a user to generate the biometric image information.

The seed supplying module 120 supplies the secure seed with a security which is effective for a preset time period. The seed supplying module 120 may include any one of the watermark key receiving unit 121 and the OTP generation unit 123 or may include all of them.

The watermark key receiving unit 121 receives a watermark key in real-time from the biometric information authenticating apparatus 300, which authenticates the user on a basis of the biometric information, and provides the watermark key which will be used as the secure seed to the secure pattern generating module 130.

The OTP generation unit 123 generates an OTP that is effective for a preset time period and provides the OTP as the secure seed to the secure pattern generating module 130. For example, the OTP generation unit 123 may generate the OTP that is effective for the preset time period by the help of an algorithm which uses both a value of current time and a unique secret key as a seed value. The OTP generation unit 123 may utilize a value within a predetermined time range rather than a value of moment in time when generating the OTP.

The secure pattern generating module 130 generates the secure watermark pattern based on the secure seed supplied from the seed supplying module 120. In other words, the secure pattern generating module 130 generates the secure watermark pattern of which shape may vary with the secure seed.

The biometric information generating module 140 generates the biometric information for authentication by the use of the biometric image information, which is generated by the biometric scanning module 110, and the secure watermark pattern, which is generated by the secure pattern generating module 130. For example, the biometric information generating module 140 may generate and output a biometric image into which the secure watermark pattern is inserted.

Figure 3:
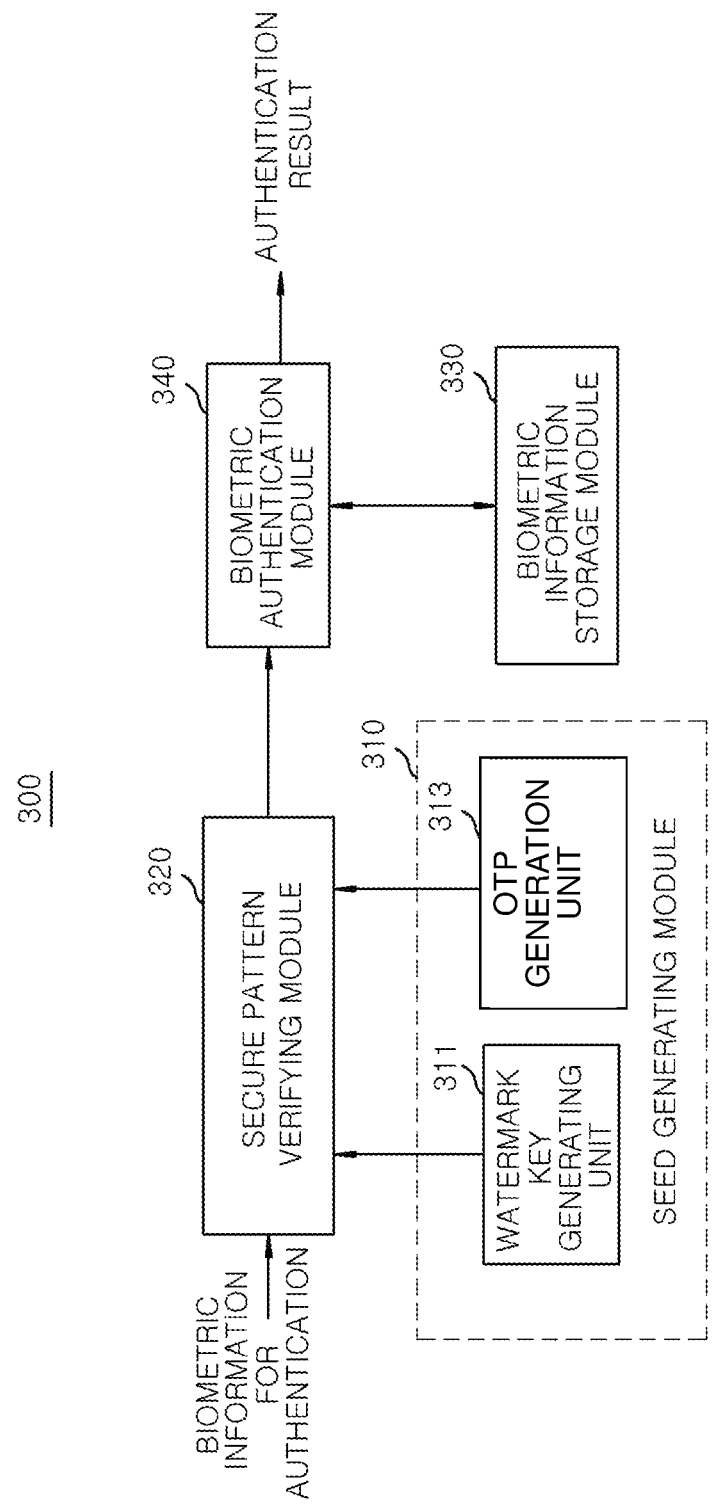
FIG. 3 is a block diagram of a biometric information authenticating apparatus in accordance with an embodiment of the present invention.

FIG. 3 is a block diagram of the biometric information authenticating apparatus 300 in accordance with an embodiment of the present invention.

As illustrated in this drawing, the biometric information authenticating apparatus 300 includes a seed generating module 310, a secure pattern verifying module 320, a biometric information storage module 330, and a biometric authentication module 340.

The seed generating module 310 serves to generate the secure seed having a security that is effective for a preset time period. The seed generating module 310 may include any one of a watermark key generating unit 311 and an OTP generating unit 313 or may include all of them.

The watermark key generating unit 311 generates the watermark key in real time which will be used as the secure seed and sends the watermark key to the biometric information generating apparatus 100 which generates the biometric information by scanning the body of the user.

The OTP generating unit 313 generates the OTP that is effective for a preset time period, which will be used as the secure seed. For example, the OTP generating unit 313 may generate the OTP that is effective for the preset time period by the help of an algorithm which uses both a value of current time and a unique secret key as a seed value. The OTP generating unit 313 may utilize a value within a predetermined time range rather than a value of moment in time when generating the OTP.

The secure pattern verifying module 320 performs a primary authentication in case where the biometric information incorporates the secure watermark pattern that can be generated by using the secure seed provided from the seed generating module 310.

The biometric information storage module 330 stores therein reference biometric information to be used in the authentication.

The biometric authentication module 340 performs a secondary authentication on the user depending on a result of comparison between the biometric information and the reference biometric information in the biometric information storage module 330 when the primary authentication is performed by the secure pattern verifying module 320.

Figure 4:
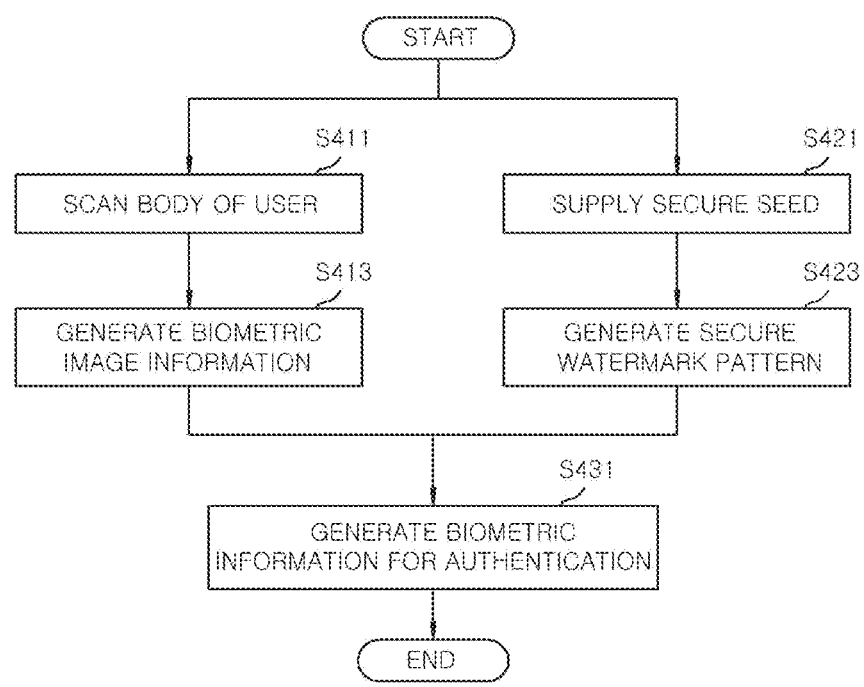
FIG. 4 is a flowchart illustrating a method for generating biometric information in accordance with an embodiment of the present invention.

FIG. 4 is a flowchart illustrating a method for generating biometric information in accordance with an embodiment of the present invention.

As illustrated in the drawing, a biometric information generating method of the embodiment includes scanning the body of the user at block S411 and generating the biometric image information at block S413.

The method further includes generating the secure watermark pattern based on the secure seed having a security that is effective for the preset time period at blocks S421 and S423. In this regard, the secure seed may be derived as the watermark key, which is provided in real time from the biometric information authenticating apparatus for authenticating the user through the biometric information, or the OTP that is effective for the preset time period.

The method further includes generating the biometric information for authentication by the use of the biometric image information generated at block S413 and the secure watermark pattern generated in block 423.

Figure 5:
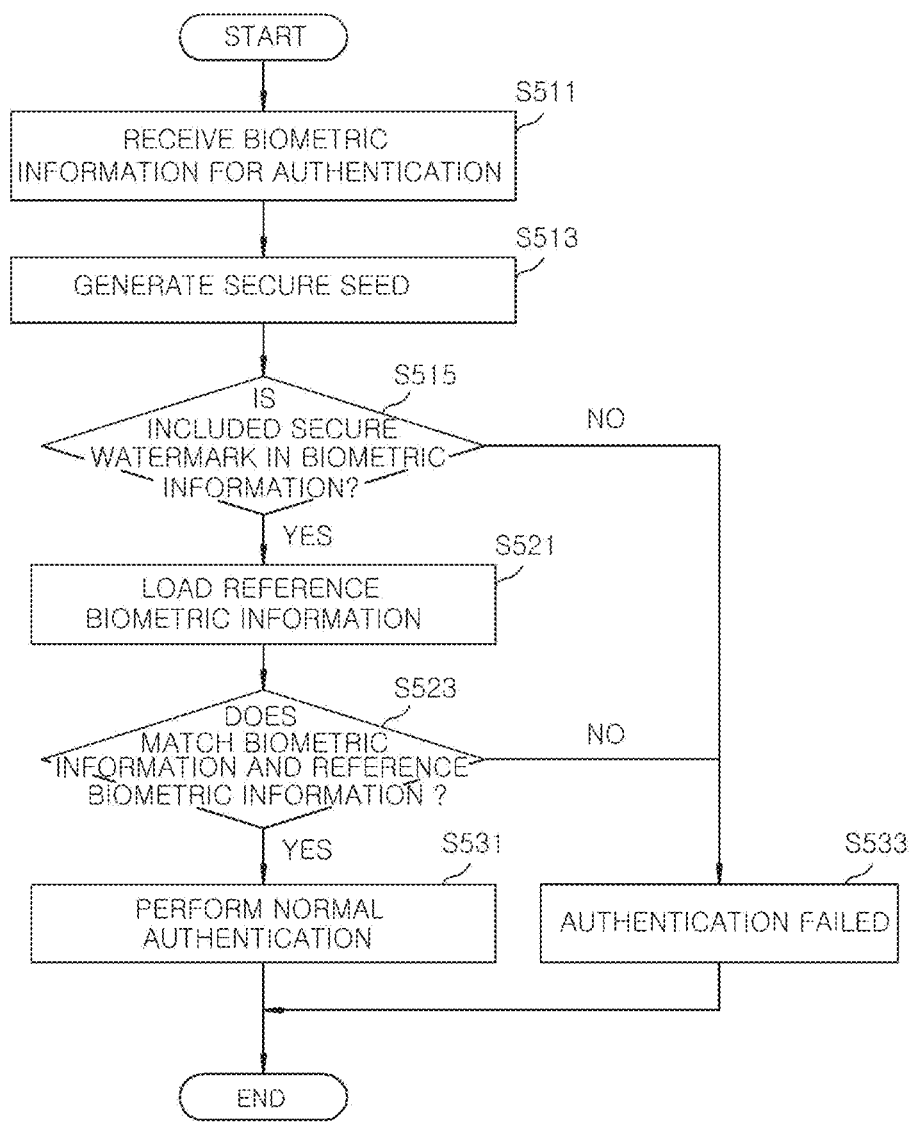
FIG. 5 is a flowchart illustrating a method for authenticating biometric information in accordance with an embodiment of the present invention.

FIG. 5 is a flowchart illustrating a method for authenticating biometric information in accordance with an embodiment of the present invention.

As illustrated in the drawing, a biometric information authenticating method includes generating the secure seed having the security that is effective for the preset time period upon receiving the biometric information for authentication at block S511 and block S513. In this regard, the secure seed may be derived as the watermark key which will be used to generate the secure watermark pattern or the OTP that is effective for the preset time period.

The method also includes performing the primary authentication on the biometric information in case where the biometric information incorporates the secure watermark pattern that can be generated through the use of the secure seed, and otherwise the method will not pass the primary authentication at block S515 and block S533.

In addition, when the primary authentication has been successively performed, if the result of the comparison between the biometric information and the reference biometric information indicates that both information are identical to each other or the result is satisfied with an allowable similarity, the method further includes performing a secondary authentication on the user, and otherwise the method do not pass the secondary authentication at blocks S521, S523, S531 and S533.

Hereinafter, the biometric information generating method and the biometric information authenticating method will be described in more detail with reference to FIGS. 1 to 5.

First, the biometric information generating apparatus 100 generates biometric image information by scanning a human body of the user, generates a secure watermark pattern using a secure seed having a security that is effective for a preset time period, and generates biometric information to be used in authentication by using both the biometric image information and the secure watermark pattern.

The process of generating the biometric information by the biometric information generating apparatus 100 will be discussed in more detail as follows.

The biometric scanning module 110 may include biometric image obtaining devices such as an optical sensor or a capacitive sensor to scan fingerprints of the user, a camera to scan a face and iris of the user, and a three-dimensional camera to scan depth information of the face. The biometric scanning module 110 scans the body of the user to generates biometric image information and provides the biometric information to the biometric information generating module 140 at block S411 and S413.

Further, at block S421, the seed supplying module 120 supplies the secure seed having a security for a preset time period to the secure pattern generating module 130. The seed supplying module 120 may include any one of the watermark key receiving unit 121 and the OTP generation unit 123 or may include all of them.

By way of example, in case where the seed supplying module 120 incorporates the watermark key receiving unit 121, the watermark key receiving unit 121 receives the watermark key in real time from the biometric information authenticating apparatus 300, which authenticates the user using the biometric information, and provides the watermark key, which will be used as the secure seed, to the secure pattern generating module 130.

Or, in case where the seed supplying module 120 incorporates the OTP generation unit 123, the OTP generation unit 123 generates the OTP that is effective for the preset time period and provides the OTP which will be used as the secure seed to the secure pattern generating module 130. As an example, the OTP generation unit 123 may generate the OTP that is effective for the preset time period by the help of an algorithm which uses both a value of current time and a unique secret key as a seed value. The OTP generation unit 123 may generate the OTP by utilizing a value within a predetermined time range rather than a value of moment in time. The reason for this is to prevent the authentication from being affected by the deviation caused by the time taken to generate the OTP by the OTP generating unit 313 of the biometric information authenticating apparatus 300.

At block S423, the secure pattern generating module 130 then generates the secure watermark pattern based on the secure seed provided from the seed supplying module 120 and provides the same to the biometric information generating module 140. In other words, the shape of the secure watermark pattern may depend on the secure seed that is effective for the preset time period; therefore, the security of the watermark pattern will also be maintained for the preset time period.

Subsequently, at block S431, the biometric information generating module 140 generates the biometric information to be for authentication on a basis of the biometric image information, which is generated by the biometric scanning module 110, and the secure watermark pattern, which is generated by the secure pattern generating module 130, and provides the same to the biometric information utilization apparatus 200. For example, the biometric information generating module 140 may generate and output a biometric image into which the secure watermark pattern is inserted. Similarly to the above, since the biometric information has the secure watermark pattern inserted therein that is effective for the preset time period, the security of the biometric information will also be maintained for the preset time period.

Meanwhile, the biometric information utilization apparatus 200, which is provided with the biometric information having the secure watermark pattern inserted therein, may be a client device to be supplied with various services or contents by obtaining the authentication through the biometric information. To do it, the biometric information utilization apparatus 200 may request the biometric information authenticating apparatus 300 to authenticate the biometric information.

Thus, upon receiving the biometric information along with the request for authentication thereof, the biometric information authenticating apparatus 300 performs a primary authentication on the biometric information requested for authentication in case where the biometric information includes the secure watermark pattern that can be generated using the secure seed and then performs a secondary authentication based on a result of the comparison between the biometric information requested for authentication and a pre-stored reference biometric information when the primary authentication has been performed.

The process of authenticating the biometric information performed by the biometric information authenticating apparatus 300 will be discussed in more detail as follows.

When receiving the biometric information for authentication at block S511, the biometric seed generating module 310 generates the secure seed having a security that is effective for the preset time period and sends the secure seed to the secure pattern verifying module 320 at block S513. The seed supplying module 120 may include any one of the watermark key generating unit 311 and the OTP generating unit 313 or may include all of them. By way of example, in case where the seed supplying module 120 of the biometric information generating apparatus 100 incorporates the watermark key receiving unit 121, the seed generating module 310 of the biometric information authenticating apparatus 300 may include the watermark key generating unit 311. Or, in case where the seed supplying module 120 of the biometric information generating apparatus 100 incorporates the OTP generation unit 123, the seed generating module 310 of the biometric information authenticating apparatus 300 may include the OTP generating unit 313. The OTP generating unit 313 may generate the OTP by utilizing a value within a predetermined time range rather than a value of moment in time. The reason for this is to prevent the authentication from being affected by the deviation caused by the time taken to generate the OTP generation unit 123 of the biometric information creating apparatus 100.

Next, at block S515, the secure pattern verifying module 320 verifies whether the secure watermark pattern that can be generated by the secure seed provided from the seed generating module 310 is included in the biometric information. If it is verified that the secure watermark pattern is included in the biometric information, the secure pattern verifying module 320 performs normally the primary authentication on the biometric information, and otherwise the primary authentication fails at block S533.

Furthermore, at block S521, the biometric authentication module 340 loads the reference biometric information that is already stored in the biometric information storage module 330 in order to utilize it in the authentication.

Subsequently, at block S523, the biometric authentication module 340 compares the biometric information that has passed the primary authentication at block S515 and the reference biometric information in the biometric information storage module 330. As a result of the comparison, the secondary authentication is performed when the biometric information passed the primary authentication matches the reference biometric information. Alternatively, although the biometric information passed the primary authentication does not exactly match the reference biometric information, the secondary authentication may also be performed if the discrepancy between them satisfies an allowable similarity lower than a threshold.

However, at block S533, when the biometric information passed the primary authentication does not match the reference biometric information as well as when the discrepancy between them does not satisfy the allowable similarity lower than the threshold, the secondary authentication fails and the process may then end.

As set forth above, in accordance with the embodiments of the present invention, the biometric information having the secure watermark pattern included therein, which is effective for a predetermined time period, is generated in order to use a biometric authentication of a user. When a biometric authentication of the biometric information is performed, it is normally conducted if the secure watermark pattern included in the biometric information is generated within the predetermined time period.

Therefore, even if the biometric information having the secure watermark pattern included therein is leaked from a device which utilizes the biometric information to authenticate the user due to the hacking or the like, the leaked biometric information will be useless when the predetermined time period has lapsed. Accordingly, the authentication of the leaked biometric information will be failed, thereby guaranteeing an improved security for the biometric information.

The combinations of the each block of the block diagram and each operation of the flow chart may be derived from computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in computer readable memory or a memory usable in a computer which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions derived from the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of the exemplary embodiments of the present invention, and it will be understood by those skilled in the art to which this invention belongs that various changes and modifications may be made without departing from the scope of the essential characteristics of the embodiments of the present invention. Therefore, the exemplary embodiments disclosed herein are not used to limit the technical idea of the present invention, but to explain the present invention, and the scope of the technical idea of the present invention is not limited to these embodiments. Therefore, the scope of protection of the present invention should be construed as defined in the following claims and changes, modifications and equivalents that fall within the technical idea of the present invention are intended to be embraced by the scope of the claims of the present invention.

What is claimed is:

1. An apparatus for generating biometric information, the apparatus comprising:
    a biometric scanning module configured to scan a body of a user to generate biometric image information;
    a seed supplying module configured to supply a secure seed having a security that is effective for a preset time period and valid for a one-time use;
    a security pattern generating module configured to generate a secure watermark pattern based on the secure seed; and
    a biometric information generating module configured to generate biometric information to be used for authentication by the use of the biometric image information and the secure watermark pattern.

2. The apparatus of claim 1, wherein the seed supplying module comprises a watermark key receiving unit configured to receive a watermark key which will be used as the secure seed and provide it to the security pattern generation, wherein the watermark key is provided in real-time from a biometric authentication apparatus which utilizes the biometric information to authenticate the user.

3. The apparatus of claim 1, wherein the seed supplying module comprises a one-time password (OTP) generating unit configured to generate an OTP that is effective for the preset time period and supply the OTP to the secure pattern generating module as the secure seed.

4. A method for generating biometric information to be used for authentication, the method comprising:
    generating biometric image information by scanning a body of a user;
    generating a secure watermark pattern based on a secure seed having a security that is effective for a preset time period and valid for a one-time use; and
    generating the biometric information through the use of the biometric image information and the secure watermark pattern.

5. The method of claim 4, wherein said generating a secure watermark pattern comprises generating the secure watermark pattern using a watermark key as the secure seed which is received in real-time from a biometric authentication apparatus which utilizes the biometric information to authenticate the user.

6. The method of claim 4, wherein said generating a secure watermark pattern comprises generating the secure watermark pattern using a one-time password (OTP) as the secure seed.

7. An apparatus for authenticating biometric information, the apparatus comprising:
    a seed generating module configured to generate a secure seed having a security that is effective for a preset time period and valid for a one-time use;
    a secure pattern verifying module configured to perform a primary authentication on biometric information to be used for authentication when the biometric information includes a secure watermark pattern that is generated based on the secure seed;
    a biometric information storage module configured to store reference biometric information to be used for an authentication procedure; and
    a biometric authenticating module configured to perform a secondary authentication depending on a result of comparison between the biometric information and the reference biometric information when the primary authentication has been performed.

8. The apparatus of claim 7, wherein the seed generating module comprises a watermark key generating unit configured to generate in real time a watermark key as the secure seed which is capable of generating the secure watermark pattern.

9. The apparatus of claim 8, wherein the watermark key generating unit is configured to provide the watermark key to a biometric information generating apparatus which generates the biometric information by scanning a body of a user.

10. The apparatus of claim 7, wherein the seed generating module comprises a OTP generating unit configured to generate a one-time password (OTP) as the secure seed.

11. A method for authenticating biometric information, the method comprising:
    generating a secure seed having a security that is effective for a preset time period and valid for a one-time use;
    performing a primary authentication on biometric information to be used for authentication when the biometric information includes a secure watermark pattern that can be generated based on the secure seed; and
    performing a secondary authentication depending on a result of comparison between the biometric information and a pre-stored reference biometric information.

12. The method of claim 11, wherein said generating a secure seed comprises generating in real time a watermark key as the secure seed that is capable of generating the secure watermark pattern.

13. The method of claim 11, wherein said generating a secure seed comprises generating a one-time password (OTP) as the secure seed.

14. A system for generating and authenticating biometric information, the system comprises:
    a biometric information generating apparatus configured to generate biometric image information by scanning a body of a user, generate a secure watermark pattern based on a secure seed which is effective for a preset time period and valid for a one-time use, and generate biometric information to be used for authentication through the use of the biometric image information and the secure watermark pattern; and
    a biometric information authenticating apparatus configured to perform a primary authentication on the biometric information when the biometric information includes a secure watermark pattern that is generated based on the secure seed and perform a secondary authentication depending on a result of comparison between the biometric information and a pre-stored reference biometric information.

* * * * *